United States Patent [19]

Honsho et al.

[11] Patent Number: 5,308,014
[45] Date of Patent: May 3, 1994

[54] TAPE CASSETTE WITH FRONT AND INNER TAPE COVERING LIDS

[75] Inventors: Hironori Honsho, Neyagawa; Fuminari Saito, Kawanishi, both of Japan

[73] Assignee: Matsushita Electric Industrial Co., Ltd., Osaka, Japan

[21] Appl. No.: 875,594

[22] Filed: Apr. 28, 1992

Related U.S. Application Data

[63] Continuation of Ser. No. 530,965, May 25, 1990, abandoned.

[30] Foreign Application Priority Data

| May 29, 1989 | [JP] | Japan | 1-134909 |
| Oct. 12, 1989 | [JP] | Japan | 1-266908 |
| Feb. 9, 1990 | [JP] | Japan | 2-30873 |

[51] Int. Cl.⁵ .................. G11B 15/60; G11B 23/087
[52] U.S. Cl. .................................................. 242/199
[58] Field of Search ............... 242/197, 198, 199; 360/132

[56] References Cited

U.S. PATENT DOCUMENTS

| 4,173,319 | 11/1979 | Umeda | 242/199 |
| 4,235,395 | 11/1980 | Wardenaar et al. | 242/199 |
| 4,449,677 | 5/1984 | Ohta et al. | 242/199 |
| 4,457,473 | 7/1984 | Mroz et al. | 242/192 |
| 4,527,755 | 7/1985 | Rood et al. | 242/199 |
| 4,608,616 | 8/1986 | Wakui et al. | 242/199 |
| 4,646,191 | 2/1987 | Goto | 242/199 |
| 4,680,660 | 7/1987 | Ueda | 242/199 |
| 4,685,016 | 8/1987 | Baranski | 360/132 |
| 4,748,529 | 5/1988 | Shiba et al. | 242/199 |
| 4,836,465 | 6/1989 | May et al. | 242/192 |
| 4,844,377 | 7/1989 | Shiomi et al. | 242/199 |
| 4,864,448 | 9/1989 | Karibe et al. | 360/132 |
| 4,933,796 | 6/1990 | Tanaka | 242/199 |

FOREIGN PATENT DOCUMENTS

| 0129844 | 6/1984 | European Pat. Off. |
| 0143536 | 6/1985 | European Pat. Off. |
| 0255775 | 2/1988 | European Pat. Off. |
| 0316178 | 11/1988 | European Pat. Off. |
| 7912905 | 1/1980 | Fed. Rep. of Germany |
| 60-121580 | 6/1965 | Japan |
| 6132284 | 2/1966 | Japan |
| 58-215770 | 12/1983 | Japan | 360/132 |
| 60-214488 | 10/1985 | Japan |
| 62-241189 | 10/1987 | Japan |
| 63-16824 | 4/1988 | Japan |
| 63-16829 | 4/1988 | Japan |
| 63-18271 | 4/1988 | Japan |
| 8707424 | 12/1987 | World Int. Prop. O. |

OTHER PUBLICATIONS

Patent Abstracts of Japan, vol. 9, No. 276 (P-402) (1999), 2 Nov. 1985 (60-121580).
Patent Abstracts of Japan, vol. 10, No. 188 (P-473) (2244), 3 Jul. 1986 (61-32284).
Grundig Technische Informationen, vol. 32, No. 1, Mar. 1985, pp. 3-5.

*Primary Examiner*—Daniel P. Stodola
*Assistant Examiner*—John Q. Nguyen
*Attorney, Agent, or Firm*—Wenderoth, Lind & Ponack

[57] ABSTRACT

A tape cassette which protects the tape thereof from dust, and which can be accommodated in a small volume. This is achieved by providing both a front lid and an inner lid and by making a distance between a rotation axis of the cassette front lid and a cassette bottom surface greater than a distance between a surface of the tape stretched along the front of the cassette case and the rotation axis of the cassette front lid. In addition, a restriction plate is provided for restricting rearward movement of the tape stretched along the front of the cassette case.

5 Claims, 16 Drawing Sheets

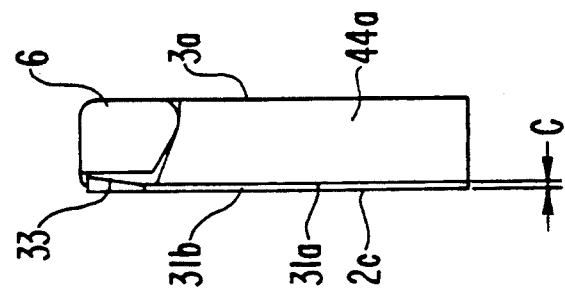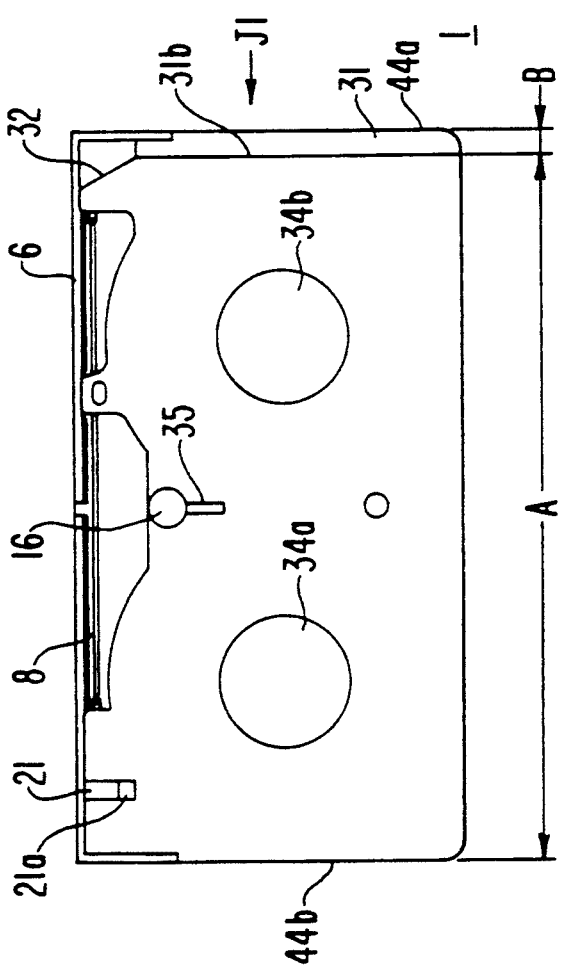

TAPE CASSETTE WITH FRONT AND INNER TAPE COVERING LIDS

This application is a continuation of now abandoned application Ser. No. 07/530,965, filed on May 25, 1990, now abandoned.

BACKGROUND OF THE INVENTION

1. Field of the Invention

The present invention relates to a tape cassette, and particularly to a tape cassette which is desirable for a magnetic recording/reproducing device such as a video tape recorder or the like.

2. Description of the Prior Art

Generally, a conventional tape cassette to be inserted into a magnetic tape device such as a video tape recorder (which will be referred to as VTR hereinafter) or the like has a construction in which front and inner lids are provided on a front surface of a case and cover a magnetic tape which extends along the front surface of the case (for example, refer to Japanese Laid-Open Patent Publication No. 63-175279).

The above conventional tape cassette is described hereinafter with reference to the drawings.

FIG. 28 is a perspective view of the tape cassette of the prior art, and FIGS. 29 and 30 are sectional views of an important portion of the tape cassette of the prior art.

In FIGS. 28 to 30, an opening 61 is provided in a front surface of the tape cassette 64 along substantially the width of the cassette 64. A magnetic tape 59 is stretched over the opening 61 and is usually covered with front and inner lids 58 and 57.

The front lid 58 is free to rotate about a supporting point pin 65. A coil spring 66 is fitted to the supporting point pin 65 and always urges the front lid 58 to rotate toward a closing direction.

A pair of brackets 67 are provided at an upper and inner side of the front lid 58. A pair of supporting pins 60 provided at both left and right ends of the inner lid 57 are inserted into the brackets 67, and the inside lid 57 can freely rotate about the supporting pins 60.

A pair of guiding pins 55 provided at both ends of the inner lid 57 are inserted into a guiding grooves 56, and are free to slide therein. A locking member 50 is rotatably provided at the cassette case 68. A plate spring 70 is fitted to a rear side of the locking member 50 and urges the locking member 50 to rotate toward a forward direction.

Usually, a protrusion 52 provided on a side plate 54 of the front lid 58 is engaged with a click 53 of the locking member 50, such that the rotation of the front lid 58 can be prevented.

Operations of the tape cassette constructed as above are described hereinafter. The tape cassette 64 usually prevents the front lid 58 from carelessly opening by means of the locking member 50.

On the other hand, when the tape cassette 64 is inserted into the video tape recorder (which will be referred to as VTR hereinafter), the locking member 50 rotates in the D direction against the force of the plate spring 70 by means of a lock releasing member 71 provided at the VTR, such that the protrusion 52 becomes disengaged from the click 53 to enable the front lid 58 to rotate as shown in FIG. 30.

Then, when the tape cassette is moved in the E direction as shown in FIG. 30, the front lid 58 is opened upward. The supporting pins 60 on the inner lid 57 are moved upward about the supporting point pin 65 and the guiding pins 55 are guided along the guiding grooves 56. Thus the lids 58 and 57 are opened.

The above is the opening operations for inserting the tape cassette 64 into the VTR, and is reversed when the tape cassette 64 is being taken out.

However, in the above construction, a length from the tape surface extending along the front surface of the cassette to the front lid rotation supporting point is larger than that from the cassette bottom surface, so that a wider cassette opening is necessary and the cassette is relatively large considering the windable tape length.

SUMMARY OF THE INVENTION

An object of the present invention is to provide a tape cassette which can prevent tape damages by utilizing inner lid having a narrower cassette opening, which provides excellent protection against dust, and which is of a simple construction.

Another object of the present invention is to provide a tape cassette which has a smaller opening for lids of the cassette and can be utilized in a VTR having a thinner deck, by providing a protrusion engaged with a cutout of the cassette case and an upwardly and downwardly movable moving member for opening the lids.

Still another object of the present invention is to provide a tape cassette which can properly locate the tape cassette in an appropriate position in a cassette holder with a simple construction even when tape cassettes of different sizes are inserted into the same cassette holder.

In order to solve the above problem, a tape cassette of the present invention comprises a pair of tape reels adapted for tape to be wound thereon and have respective ends of the tape attached thereto, which a cassette case with the tape reels mounted therein and which is adapted to have the tape extend along a front surface thereof, an opening provided at an inside of the tape extending along the front surface, a front lid which is pivotally supported on side surfaces of the cassette case and covers a front surface of the tape extending along the front surface of the cassette case rotation, and an inner lid which is pivotally supported on the front lid and covers a back surface of the tape. A rotation supporting point (rotation axis) of the front lid is located at a position where the distance thereof from a bottom surface of the cassette case is equal to or larger than a distance thereof from the surface of the tape extending along the front surface of the cassette case. With the foregoing construction, the cassette case of the present invention can prevent to the tape due to the inner lid by utilizing a simple construction, can reduce the dead space which is occupied by the front lid when the front lid is opened, and can protect the tape from dust.

As described above, the present invention provides a tape cassette with which damage to the tape can be prevented even with a small cassette opening while utilizing a simple construction, dust on the tape can be effectively prevented, a stroke for opening the lids of the cassette case can be made shorter, a VTR having a deck can be utilized by providing a protrusion which is to be engaged with a cutout of the cassette case or by providing a moving member, which moves upwardly and downwardly, for opening the lids, and a tape cassette can be located in an appropriate position in one cassette holder even when tape cassettes of different sizes are inserted into the same cassette holder.

BRIEF DESCRIPTION OF THE DRAWINGS

FIG. 13 is a rear surface view of the tape cassette.

FIG. 14 is a side view seen from a direction J1 in FIG. 13.

DETAILED DESCRIPTION OF THE REFERRED EMBODIMENTS

A tape cassette of one embodiment of the present invention is described in details hereinafter with reference to FIGS. 1 to 7.

Figure 1:
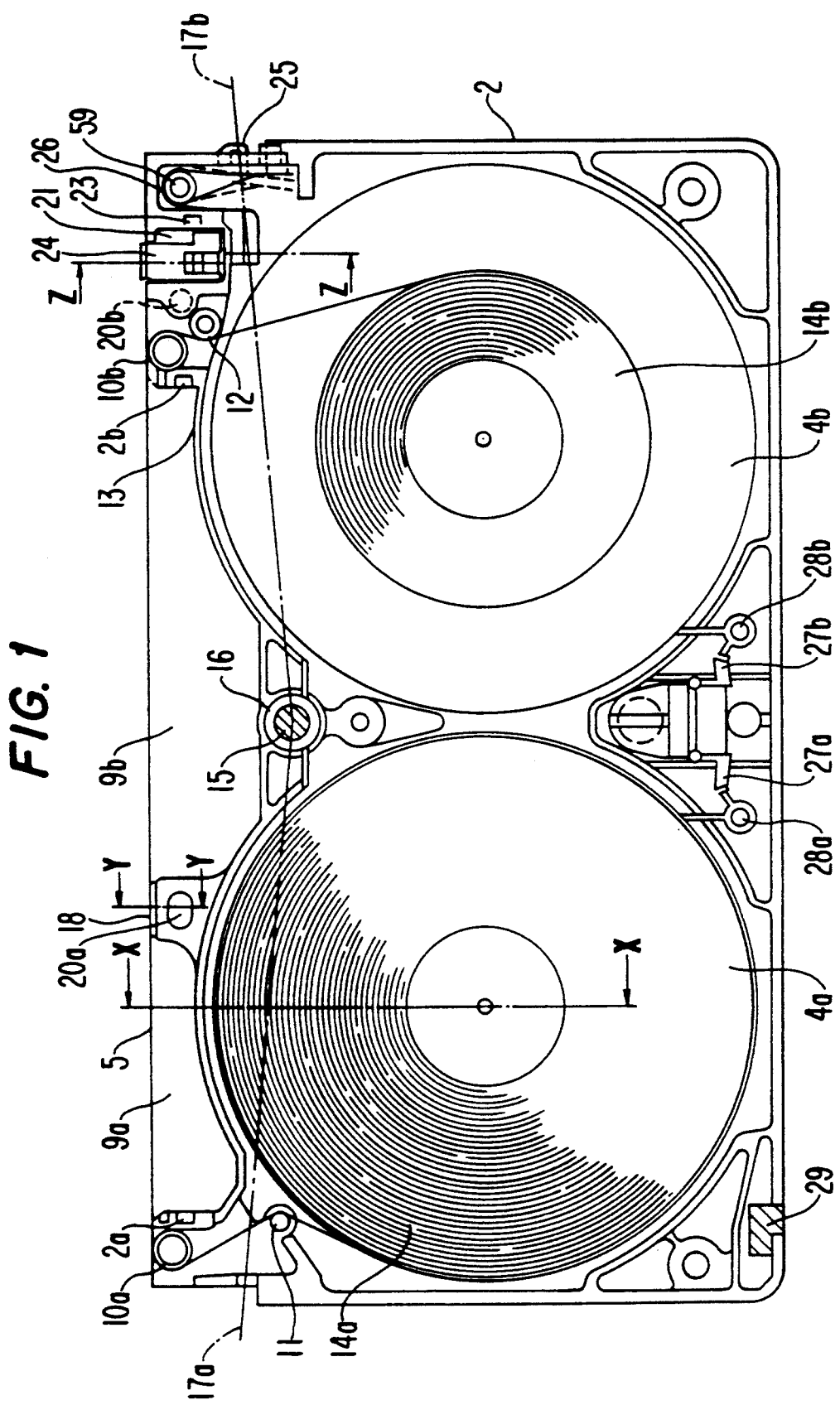
FIG. 1 is a plan view of one embodiment of the present invention without a top cassette case, a front lid, and an inner lid.
Figure 2:
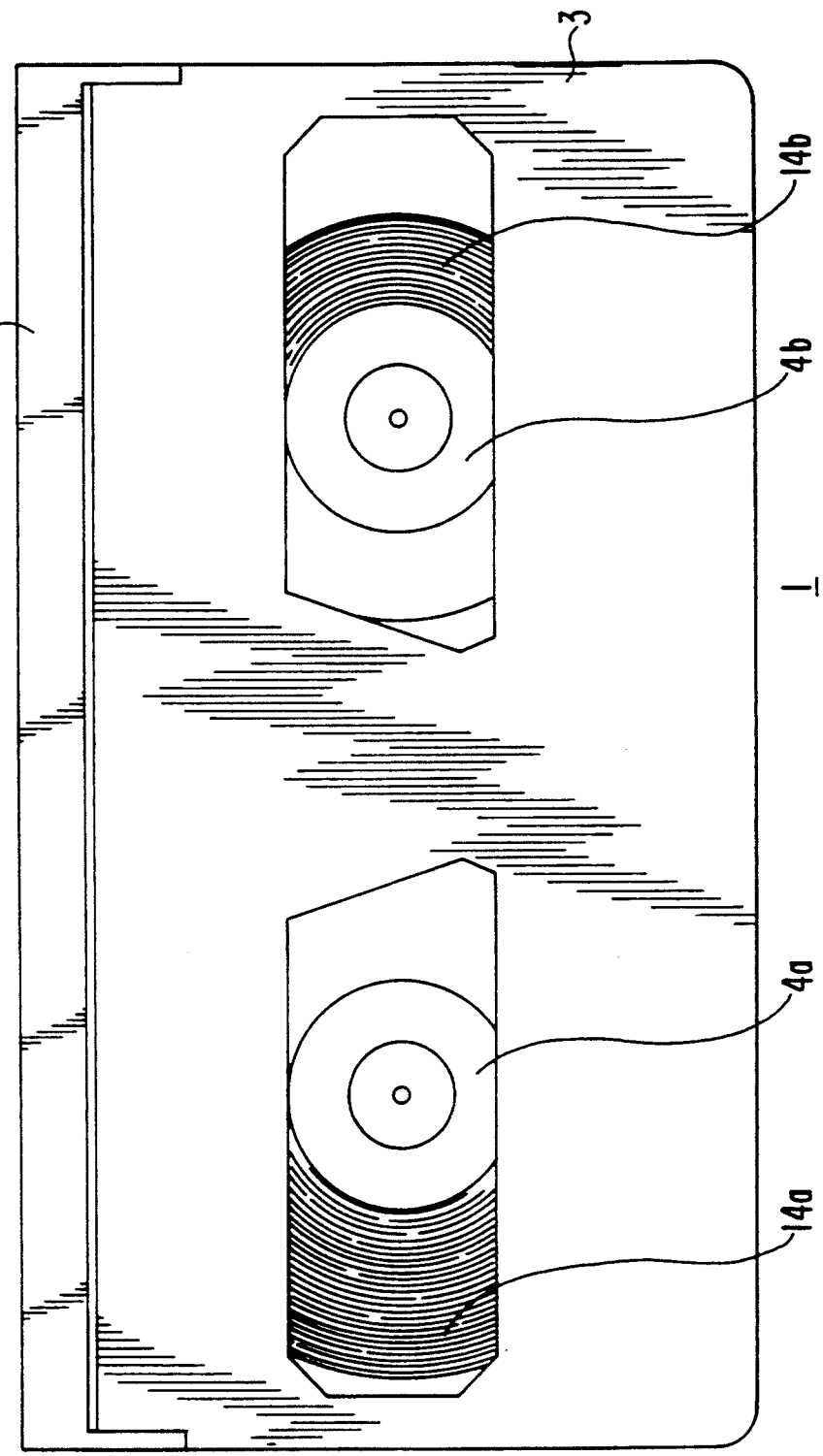
FIG. 2 is a plan view of a tape cassette.
Figure 3:
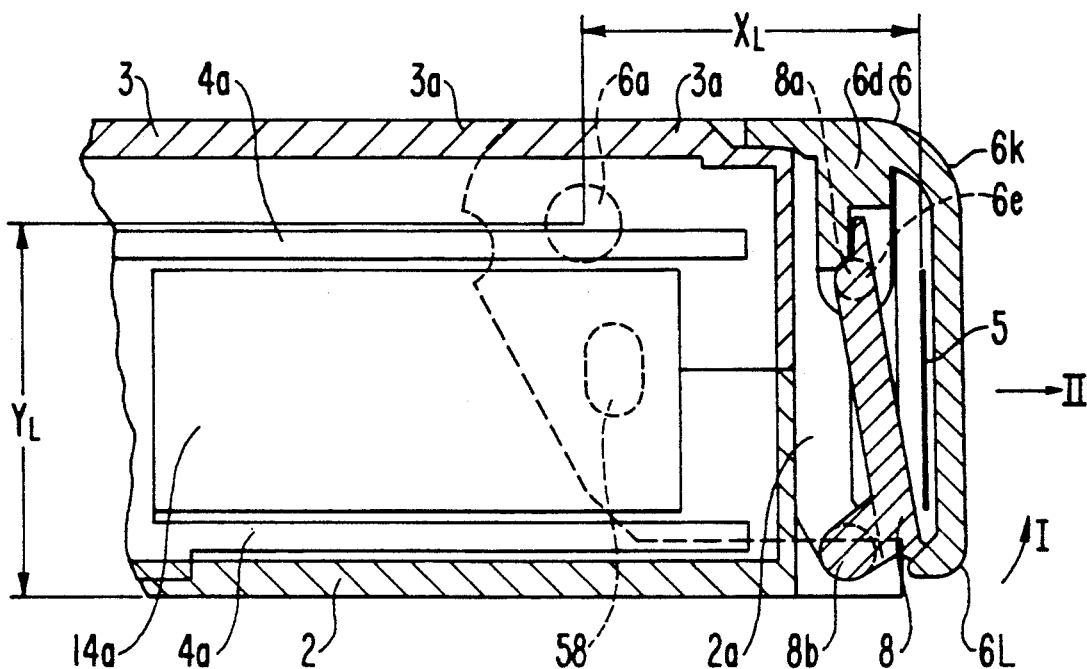
FIGS. 3 and 4 are sectional views of a main portion of the tape cassette taken along a line X—X of FIG. 1.
Figure 4:
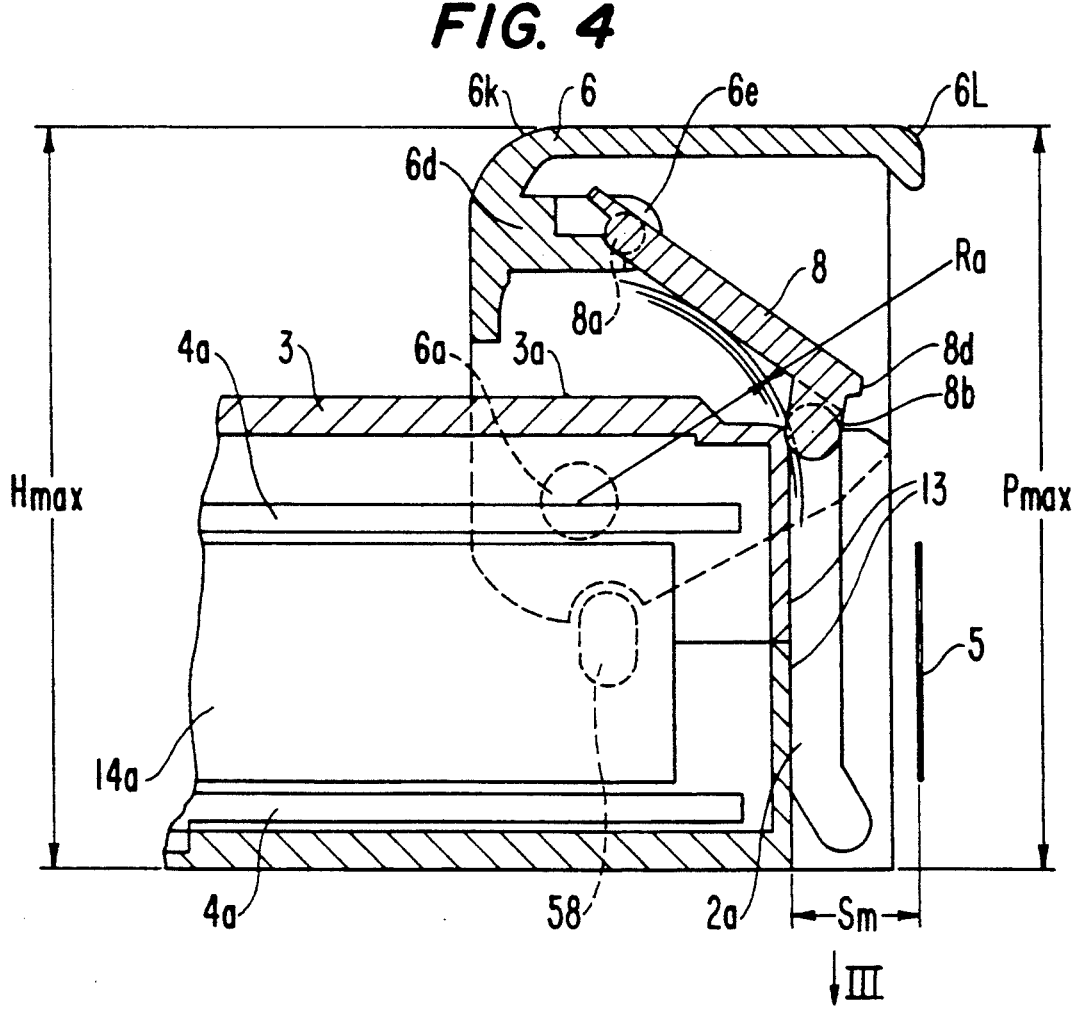
Figure 5:
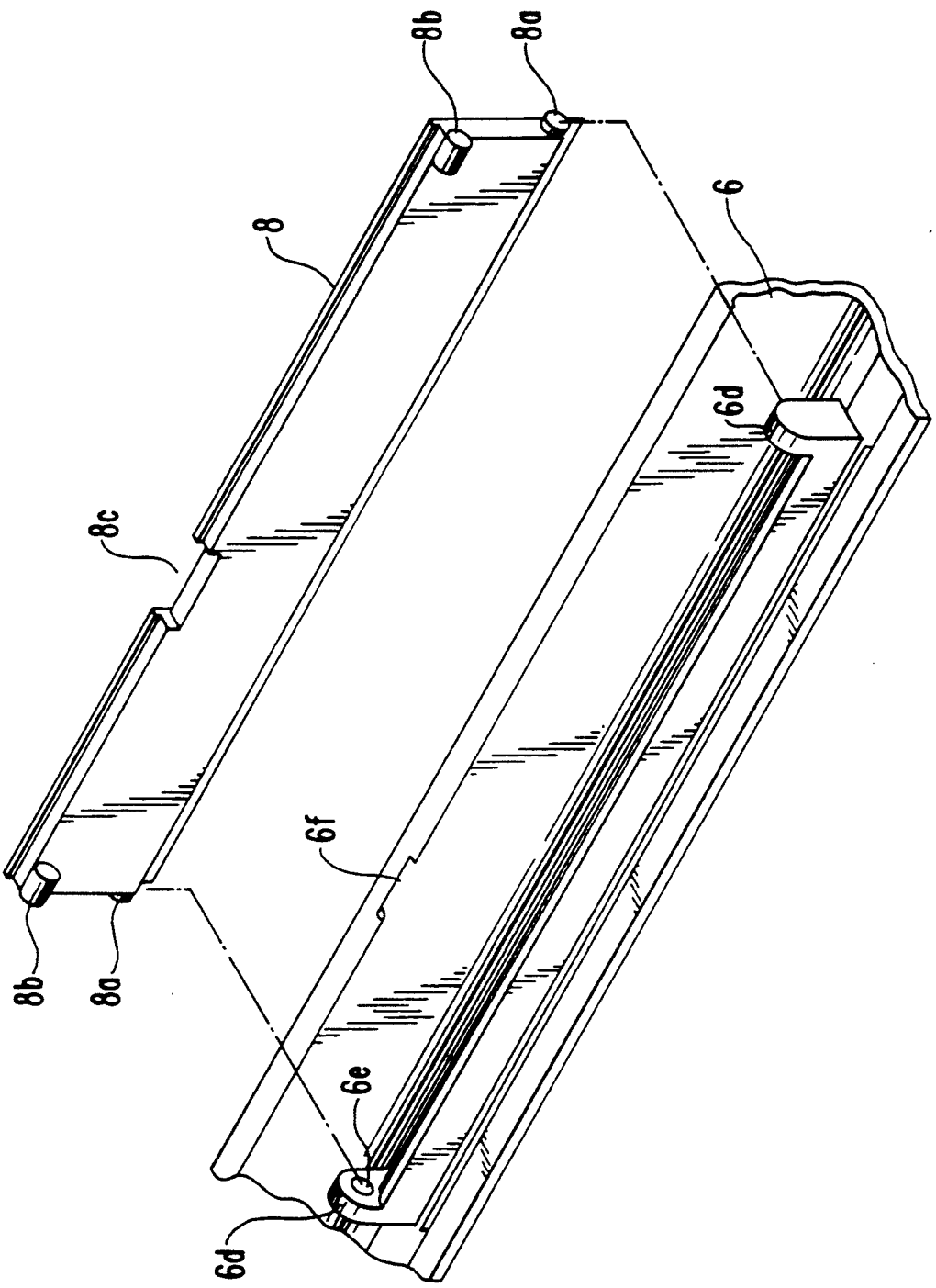
FIG. 5 is a perspective view of a main portion of an engaging portion of the front and inside lids.
Figure 6:
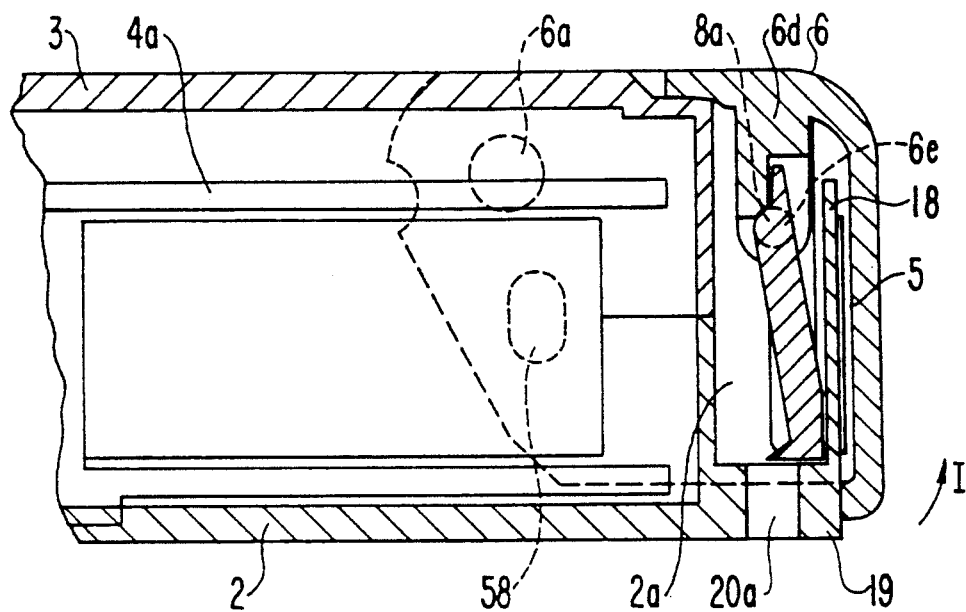
FIGS. 6 and 7 are sectional views of the tape cassette taken along a line Y—Y of FIG. 1.
Figure 7:
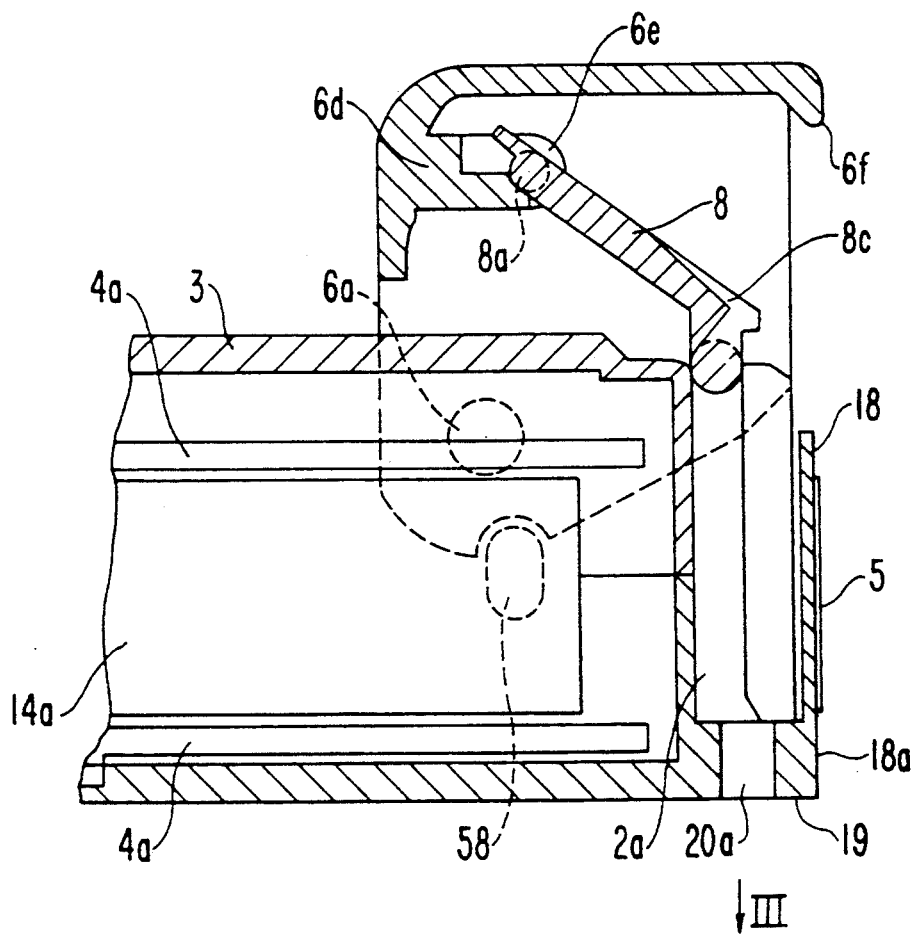

FIG. 1 is a plan view of one embodiment of the present invention without a top cassette case, a front lid, and an inner lid, FIG. 2 is a plan view of a tape cassette, FIGS. 3 and 4 are sectional views taken along a line X—X of FIG. 1, FIG. 5 is a perspective view of a main portion of an engaging portion of the front and inner lids, and FIGS. 6 and 7 are sectional views taken along a line Y—Y of FIG. 1.

In FIGS. 1 to 7, a tape cassette 1 has a bottom cassette case 2 and a top cassette case 3 engaged with each other to form a flat cassette case. This cassette case houses two cassette reels 4a, 4b aligned in a same plane, and a magnetic tape 5.

The cassette reels 4a, 4b have a starting or finishing end of the magnetic tape 5 fixed thereto, respectively, and have the magnetic tape 5 wound thereon.

A front lid 6 covers top and front surfaces of the magnetic tape 5 and has a substantially U-shape as shown in FIGS. 3 and 4 which show sectional views taken along the line X—X when the lid 6 is open or closed. A pair of front lid rotation supporting shafts 6a, 6b provided at side plates at left and right ends of the front lid 6 are pivotally supported on the cassette cases 2, 3. The front lid 6 rotates about the rotation supporting shafts 6a, 6b toward an upper surface 3a of the top cassette case 3, and opens. The front lid 6 is always urged in the closing direction by means of a front lid urging spring 7 (see FIG. 9) provided at the rotation supporting shaft 6b. This spring 7 is made of a torsion coil spring. One end thereof is supported on the top cassette case 3 and the other end thereof is supported on a pin 6c provided at the front lid rotation supporting shaft 6b.

An inner lid 8 covers a back surface of the magnetic tape 5 at openings 9a, 9b. The inner lid 8 has a pair of inner lid rotation supporting shafts 8a protruding left and right, and the inner lid rotation supporting shafts 8a are pivotally supported on a pair of left and right bearings 6e of brackets 6d integrally provided at the front lid 6 (see especially FIG. 5). The inner lid 8 can rotate about the rotation supporting shafts 8a.

Guiding grooves 2a are provided both at left and right ends of the openings 9a, 9b of the bottom cassette case 2 and guide guiding pins 8b mounted at both ends of the inner lid 8.

The openings 9a, 9b are utilized for having a post (not shown) inserted therein, and this post leads the magnetic tape 5 out of the cassette cases 2, 3. The magnetic tape 5 is extended in front of and in parallel with a front surface 13 of the cassette cases 2, 3 having a distance Sm therebetween and is guided by guiding posts 10a, 10b provided both at left and right ends of the cassette cases 2, 3, a guiding post 11, and a guiding roller 12 provided in the cassette case 2, 3.

The pair of front lid rotation supporting shafts 6a, 6b of the front lid 6 are located a distance XL from the magnetic tape 5 surface extending in front of and in parallel with the front surface 13 and a distance YL from a bottom surface 2c of the bottom cassette case 2, and XL≦YL.

The magnetic tape 5 is wound on the cassette reels 4a, 4b to form tape rolls 14a, 14b.

A lighthouse 15 made of a photodiode emits a beam to a light receiving element (not shown) in order to detect starting and finishing ends of the magnetic tape 5. The lighthouse 15 is inserted into the tape cassette 1 through an insertion hole 16.

The beam from the lighthouse 15 inserted into this insertion hole 16 extends from insides of the cassette cases 2, 3 to outside thereof along light paths 17a, 17b. In this embodiment, the light paths 17a, 17b are arranged in asymmetric angular positions.

In FIGS. 6 and 7 showing sectional views taken along the line Y—Y when the lids are closed or open, a restricting plate 18 is provided in the openings 9a, 9b, is adjacent to the back surface of the magnetic tape 5 which extends in front of the tape cassette 1, and stands approximately straight up from a base portion 19 of the bottom cassette case 2 substantially in parallel with the magnetic tape 5.

In FIG. 7 showing a state when the lids are open, a cutout 8c of a U-shape is provided at a position facing the restricting plate 18 of the inner lid 8 and engages with the restricting plate 18.

A portion 6f of the front lid 6 and a portion 8d of the inner lid 8 contact each other to cover substantially the entire magnetic tape 5 extending at the front surface of the tape cassette 1. Nevertheless, there is a little space among the front surface 18a of the restricting plate 18, the portion 6f of the front lid, and the cutout 8c of the back surface 8.

As described above, the front and inner lids 6, 8 cover the restricting plate 18 as well as the magnetic tape 5.

Position determining holes 20a, 20b are guiding holes of the tape cassette 1 and are used when the tape cassette 1 is inserted into the VTR (not shown).

Figure 8:
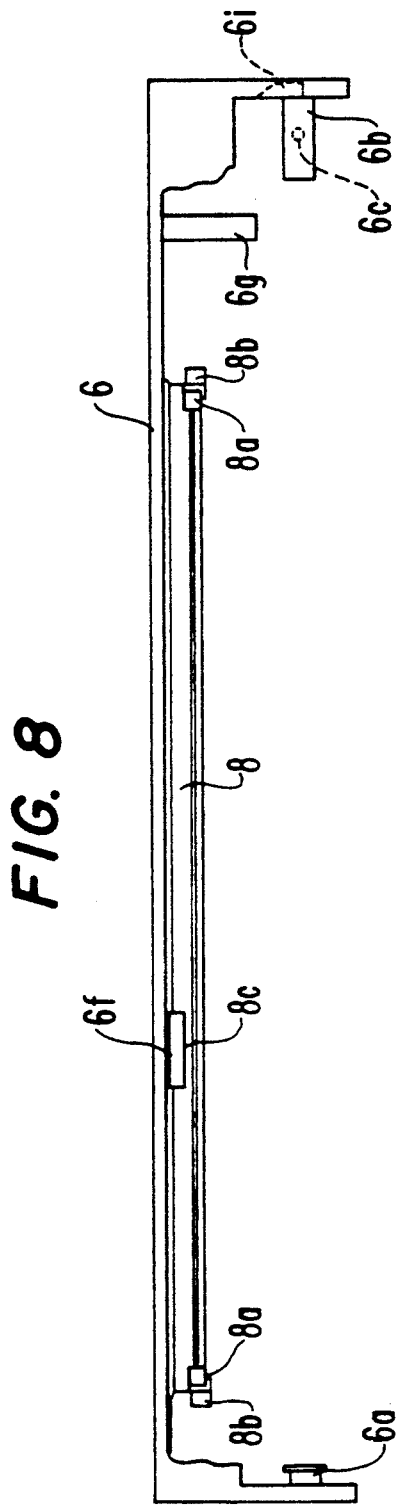
FIG. 8 is a plan view of the front and inside lids assembled together.
Figure 9:
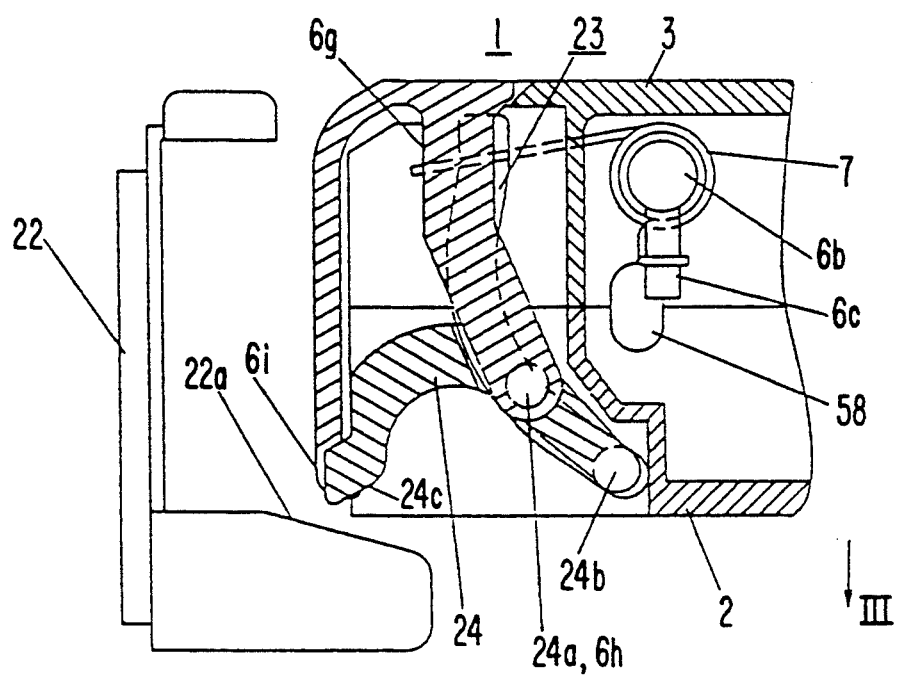
FIGS. 9, 10, and 11 are sectional views of a main portion taken along a line Z—Z of FIG. 1 when the lids are open or closed.
Figure 10:
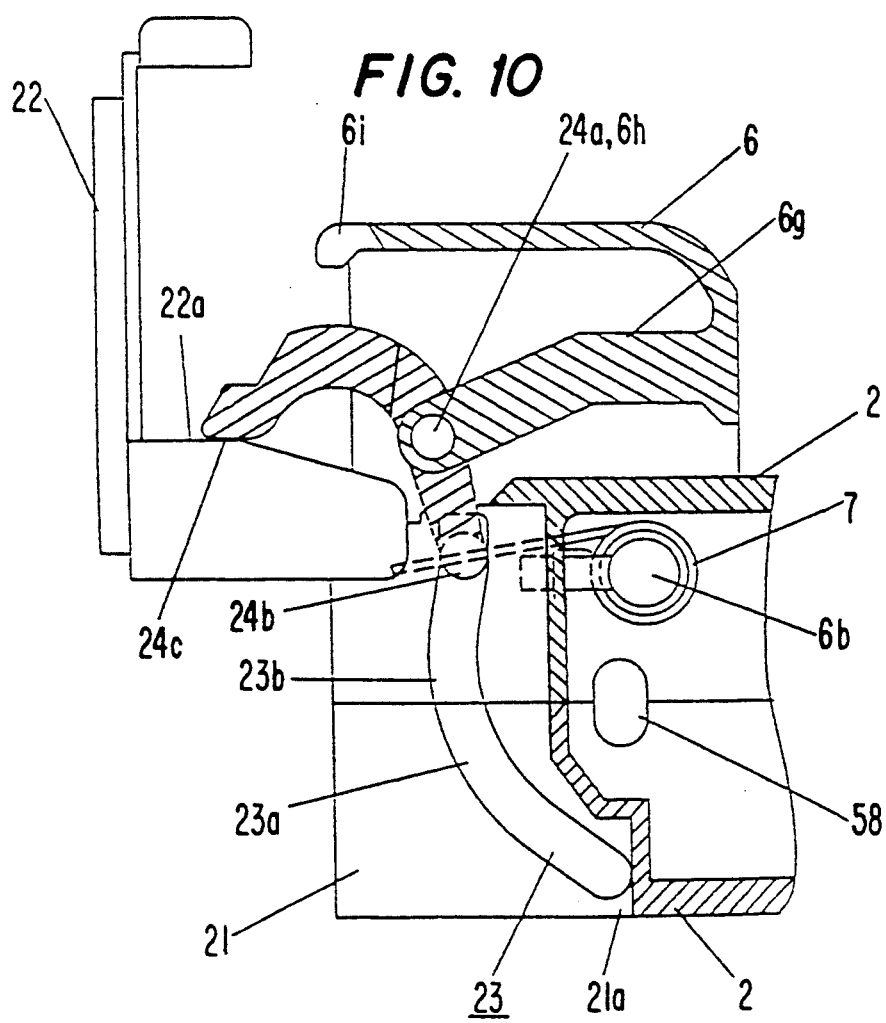

A plan view when the front and inner lids are assembled is shown in FIG. 8, and sectional views taken along the line Z—Z when the lids are closed and open are shown in FIGS. 9 and 10 respectively.

In FIGS. 8 to 10, first and second cutouts 21, 21a are formed in the cassette cases 2, 3, and lid opening portions 22a, 22b of a lid opening member 22 of the VTR are inserted into the cutout 21.

The cutouts 21, 21a have shapes which do not interfere with the light path 17b from the lighthouse 15.

A bracket 6g is formed integrally at an inside of the front lid 6 and is provided at a position facing the cutouts 21, 21a of the top and bottom cassette cases 3, 2.

A groove 23 is defined by the top and bottom cassette cases 3, 2, has a V-shape including portions 23a, 23b, and is arranged at a position which does not interfere with the light path 17b from the lighthouse 15.

A lid opening moving member 24 moves upward and downward in the cutouts 21, 21a. The lid opening moving member 24 has a shaft 24a at a substantially central portion thereof. One end of the member 24 is a guiding pin 24b, and the other end thereof is a free end 24c. The shaft 24a is rotatably and pivotally supported on a bearing 6h of the bracket 6g. The guiding pin 24b is guided by the groove 23. The free end 24c is located at a position substantially aligned with the front surface of the front lid 6 when the lids are closed, and is engaged with a cutout 6i of the font lid 6.

A locking member 25 is engaged with a locking portion 6j provided at a side plate of the front lid 6 and locks the front lid 6 so that the lid 6 is prevented from accidentally opening when the tape cassette 1 is not inserted in the VTR and damages on the magnetic tape 5 are avoided. A locking member urging spring 26 always urges the locking member 25 in the direction in which the locking member 25 comes to be engaged with the locking portion 6j of the front lid 6.

Reel brakes 27a, 27b prevent the tape 5 from being loosened due to accidental rotation of the cassette reels 4a, 4b on which the magnetic tape 5 is wound. The reel brakes 27a, 27b rotate about shafts 28a, 28b provided at the cassette cases 2, 3 and are always urged in the direction in which tip ends thereof come to be engaged with the cassette reels 4a, 4b by means of an urging spring (not shown).

An accidental erasure prevention switch 19 is provided at a substantially rectangular chamber defined by engagement of the cassette cases 2, 3 and can move freely left and right.

FIG. 13 is a back surface view of the tape cassette of one embodiment of the present invention, and FIG. 14 is a side surface view seen from the J1 direction.

Figure 15:
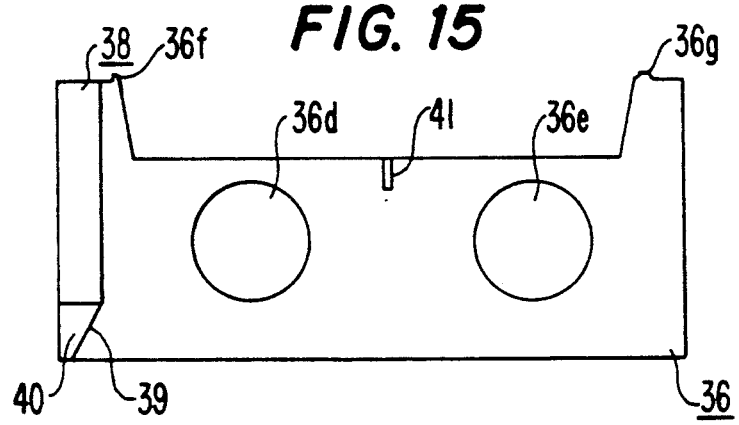
FIG. 15 is a plan view of a cassette holder.
Figure 16:
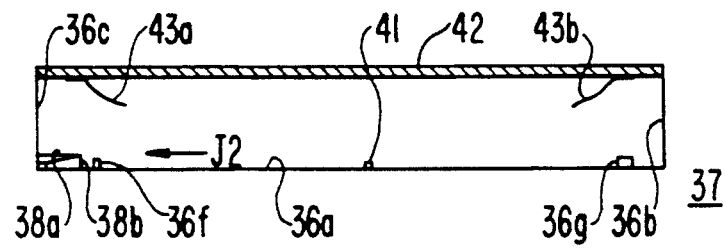
FIG. 16 is a front view of the cassette holder of FIG. 15.
Figure 17:
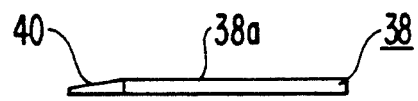
FIG. 17 is a detailed side view of a stage portion seen from a direction J2 in FIG. 16.
Figure 18:
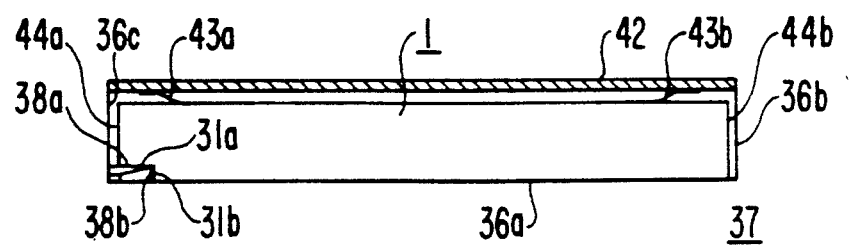
FIG. 18 is a front view showing the tape cassette of the present invention is inserted into the tape holder.
Figure 19:
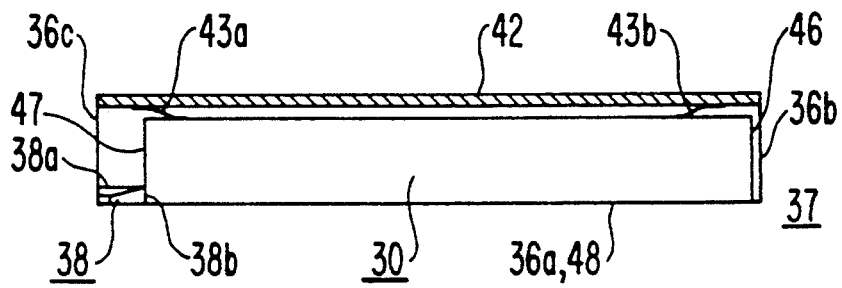
FIG. 19 is a front view showing a tape of a standard type inserted into the cassette holder.

FIG. 15 is a plan view of a cassette holder by which the tape cassette is fitted to the VTR (not shown), FIG. 16 is a front view of the cassette holder, FIG. 17 is a side view of a stage portion seen from the direction J2, FIG. 18 is a front view when the tape cassette of the present invention is inserted into the cassette holder, and FIG. 19 is a front view when a usual standard tape cassette is inserted into the cassette holder.

In FIGS. 13, 14, the tape cassette 1 is larger than a usual standard tape cassette 30 by B dimension in their width. Namely, the width of the usual standard tape cassette 30 is equal to dimension A. A tape cassette guiding stage portion 31 is formed at the back surface of the tape cassette 1 and has its width equal to dimension B and its depth equal to dimension C. A first tape 32 widens in its width as it goes toward the front, and a second taper 33 diverges in its depth. Reel stand insertion holes 34a, 34b at both supplying and winding sides of the reels 4a, 4b are also shown. A misinsertion preventing groove 35 prevents the tape cassette 1 from being inserted inappropriately upside down or in opposite directions.

In FIGS. 15 to 17, a bottom holder 36 is provided at a cassette holder 37 and has a substantially U-shape. A cassette holder stepped portion 38 is provided at an inside of the bottom cassette holder 36. Top and side surfaces 38a, 38b of the cassette holder stepped portion 38 are engaged with portions 31a and 31b of the tape cassette guiding stage portion 31 of the tape cassette 1 and guide the tape cassette 1. Tapers 39, 40 widens in their width and height as they go toward a rear surface of the cassette holder 37 along the cassette holder stepped portion 38. A misinsertion preventing click 41 prevents the tape cassette 1 from being inserted inappropriately upside down or in opposite directions.

In FIG. 18, a top cassette holder 42 is fixed to the bottom cassette holder 36 by means of fixing members (not shown) to form the cassette holder 37, and has plate springs 43a, 43b at a bottom surface thereof. The plate springs 43a, 43b urge the tape cassette 1 or the usual standard tape cassette 30 inserted into the cassette holder 37 downward.

Operations of the tape cassette 1 as constructed as described above are explained hereinafter.

FIG. 3 is a view when the lids are closed, and the magnetic tape 5 stretched over the openings 9a, 9b is usually covered with the front lid 6 and the inner lid 8.

When it is attempted to open the lid 6 upward, the lid 6 will not move and rotate in the direction of an arrow I because the locking member 25 collides with the front lid locking portion 6j. Thus, damage to the magnetic tape 5 due to an accidental opening of the front lid 6 is prevented.

When the tape cassette 1 is inserted into the cassette holder 37 waiting at a tape cassette insertion opening (not shown) of the VTR (not shown) in the direction of an arrow II, the side surface 36b of the bottom cassette holder 36 and the side surface 38b of the cassette holder stepped portion 38 guide a side surface 44b of the tape cassette 1 and the side surface 31b of the tape cassette guiding stepped portion 31 of the tape cassette 1 in the width direction of the tape cassette. In the height direction of the tape cassette 1, the tape cassette 1 is urged downward by means of the plate springs 43a, 43b, and a bottom surface 2c of the bottom cassette case 2 contacts and is restrictively guided by a top surface 36a of the bottom cassette holder 36. The top surface 38a of the cassette holder stage portion 38 does not contact the top surface 31a of the tape cassette guiding stepped portion 31.

As for restriction in the width direction, the tape cassette 1 is guided and restricted by the side surface 36b of the bottom cassette holder 36 and the side surface 38b of the cassette holder stepped portion 38, and dimensions are determined so that a side surface 44a of the tape cassette 1 is not guided and restricted by a side surface 36c of the bottom cassette holder 36.

When the tape cassette 1 is inserted into the cassette holder 37, malfunction of the VTR can be surely prevented as a result of the prevention of misinsertion of the tape cassette 1 because the tape cassette 1 and the cassette holder 37 are made asymmetrical with respect to left and right sides thereof, and because of the inclusion of a prevention mechanism comprising the misinsertion prevention groove 35 and the prevention click 41. The tapers 32, 33, 39, 40 at the tape cassette 1, the tape cassette guiding stepped portion 31 of the cassette holder 37 and the cassette holder stepped portion 38 result in a smooth insertion of the tape cassette 1 into the cassette holder 37.

When the tape cassette 1 is inserted into the cassette holder 37, movement of the tape cassette 1 in the direction of the arrow II is restricted by means of stoppers 36f, 36g provided on the bottom cassette holder 36. At the same time, the front lid locking portion 25 is released by means of a front lid lock releasing means (not shown) in the cassette holder 37 and rotates to a position shown as a broken line so as to be disengaged from the front lid locking portion 6j, so that the front lid 6 can be opened upward.

As the tape cassette 1 moves in the direction of an arrow III (FIGS. 4 and 9), the lid opening member 22 of the VTR comes to be located inside the front lid 6 and also contacts the lid opening moving member 24 which is to be engaged in the first and second cutouts 21, 21a of the cassette cases 2, 3, so that there a force is generated in the lid opening moving member 24 to move and rotate the front lid 6 clockwise about the front lid rotation supporting shafts 6a, 6b. Further movement of the front lid 6 in the direction of the arrow III will open the front lid 6 upward about the supporting shafts 6a, 6b against the front lid urging spring 7.

The inside lid 8 rotates integrally with the front lid 6 about the inside lid supporting shaft 8a while being guided and restricted by a pair of guiding grooves 2a, 2b provided at both the left and right side plates of the bottom cassette case 2, such that the state shown in FIGS. 4, 7, and 10 is achieved.

Figure 11:
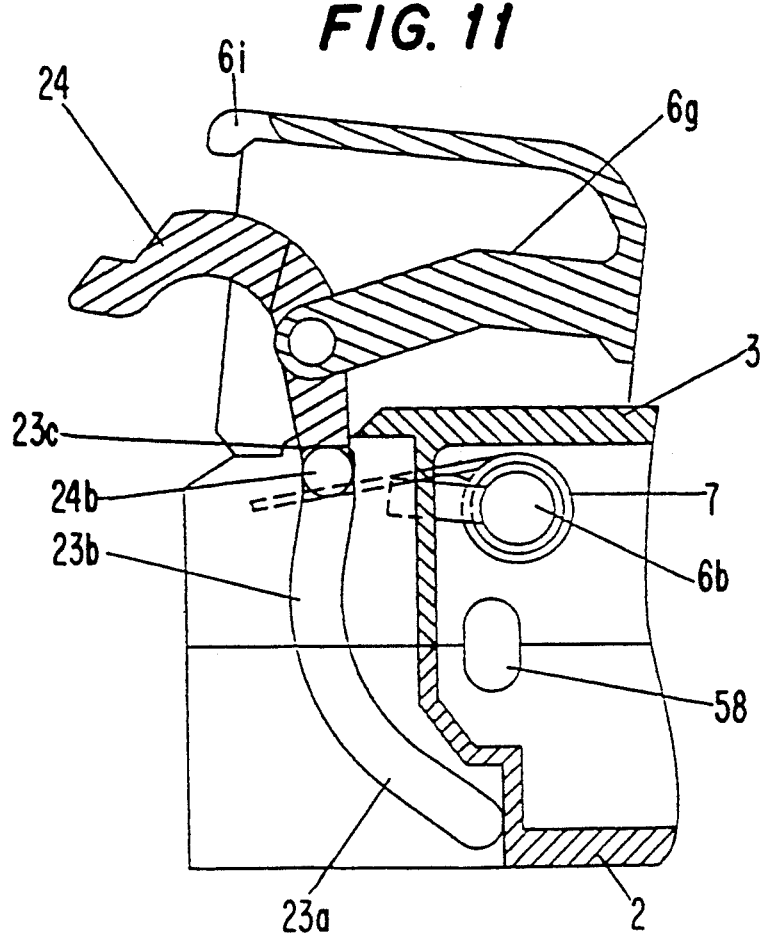

FIG. 11 shows that when there is an inadvertent attempt to open the lid opening moving member 24 and the front lid 6 beyond a certain point, a contacting portion 23c at an upper portion of the groove 23 contacts the guiding pin 24b of the moving member 24 to restrict further opening of the lid 6.

On opening the lids 6, 8, a reel brake releasing member (not shown) provided in the VTR causes the reel brakes 27a, 27b rotating in the direction departing from the cassette reels 4a, 4b to release stopping the cassette reels 4a, 4b. The reel stands (not shown) in the VTR come to support the cassette reels 4a, 4b, and the reels 4a, 4b are free to rotate. The lighthouse 15, for detecting the starting and finishing ends of the magnetic tape 5, provided at VTR and a loading post (not shown) for winding the magnetic tape 5 on a rotation cylinder (not shown) are inserted into the lighthouse insertion hole 16 and the openings 9a, 9b, respectively.

When a usual standard tape cassette 30 is inserted into the cassette holder 37, guiding and restricting of the tape cassette 30 in the width direction thereof is accomplished by means of a side surface 46 of the standard tape cassette 30 and the side surface 36b of the cassette holder 36 at one end thereof, and by means of the side surface 38b of the cassette holder stage portion 38 and a side surface 47 of the standard tape cassette 30 at the other end thereof. In the height direction of the tape cassette, the tape cassette 30 is urged downward in the same manner as the tape cassette 1 by means of the plate springs 43a, 43b, so that a bottom surface 48 of the standard tape cassette 30 contacts the top surface 36a of the bottom cassette holder 36 to be guided and restricted. The following operations are the same as for the tape cassette 1.

Operations for inserting the tape cassette 1 and the standard tape cassette 30 into a cassette insertion position of the VTR are explained so far, and to take the tape cassette 1 out of the VTR, the above opening operation need only be reversed.

Namely, the front lid 6 and the inner lid 8 rotate in the closing direction by means of an urging force of the front lid urging spring 7. If the tape cassette 1 is influenced by some kind of shock at this time and the magnetic tape 5 is loosened, the magnetic tape 5 is restricted by the restricting plate 18 so as to not be loosed backward too much, and so that damage to the tape 5 due to contact of the inner lid 8 with the magnetic tape 5 can be prevented.

In the first embodiment of the present invention, the stage portion of the tape cassette 1 is provided only at a lower end of one side surface. However, the stage portion can be provided, for example, at both side surfaces, at an upper end or the like.

Figure 12:
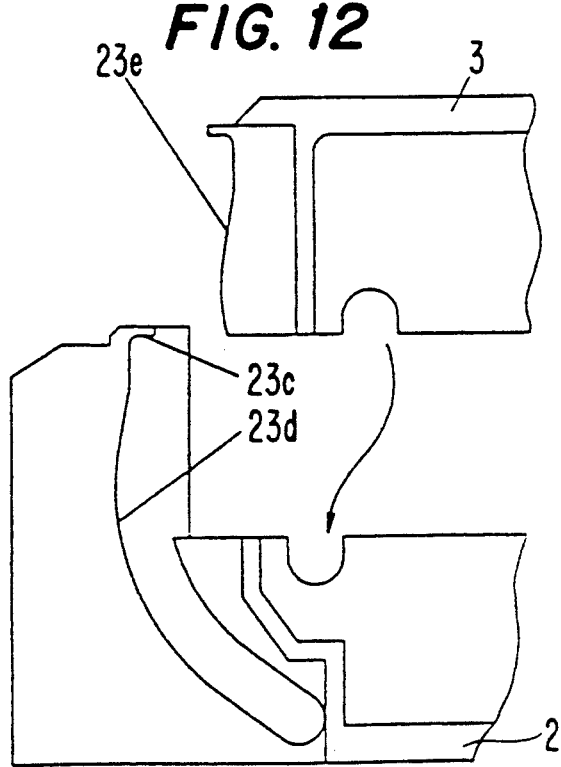
FIG. 12 is a constructional view of a groove of another embodiment.

In the first embodiment, the substantially V-shaped groove 23 is divided at a substantially central portion thereof into two groove portions, top cassette case 3 and one in the bottom cassette case 2. However, the position and shape of the groove 23 are not limited to the above. For example, as shown in FIG. 12 which represents a second embodiment, the groove 23 can be divided so that one side 23d of the groove 23 is provided in the bottom cassette case 2 and the other side 23e is provided in the top cassette case 3.

Figure 20:
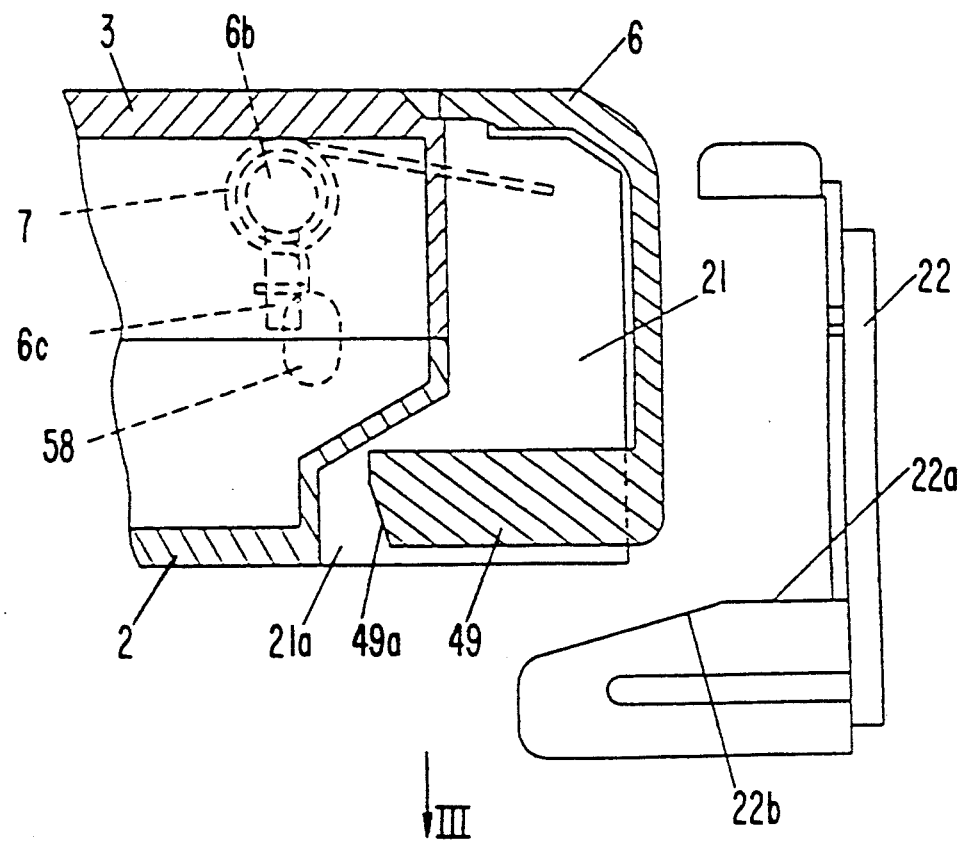
FIGS. 20 and 21 are sectional views of a main portion of a lids opening mechanism of a second embodiment.
Figure 21:
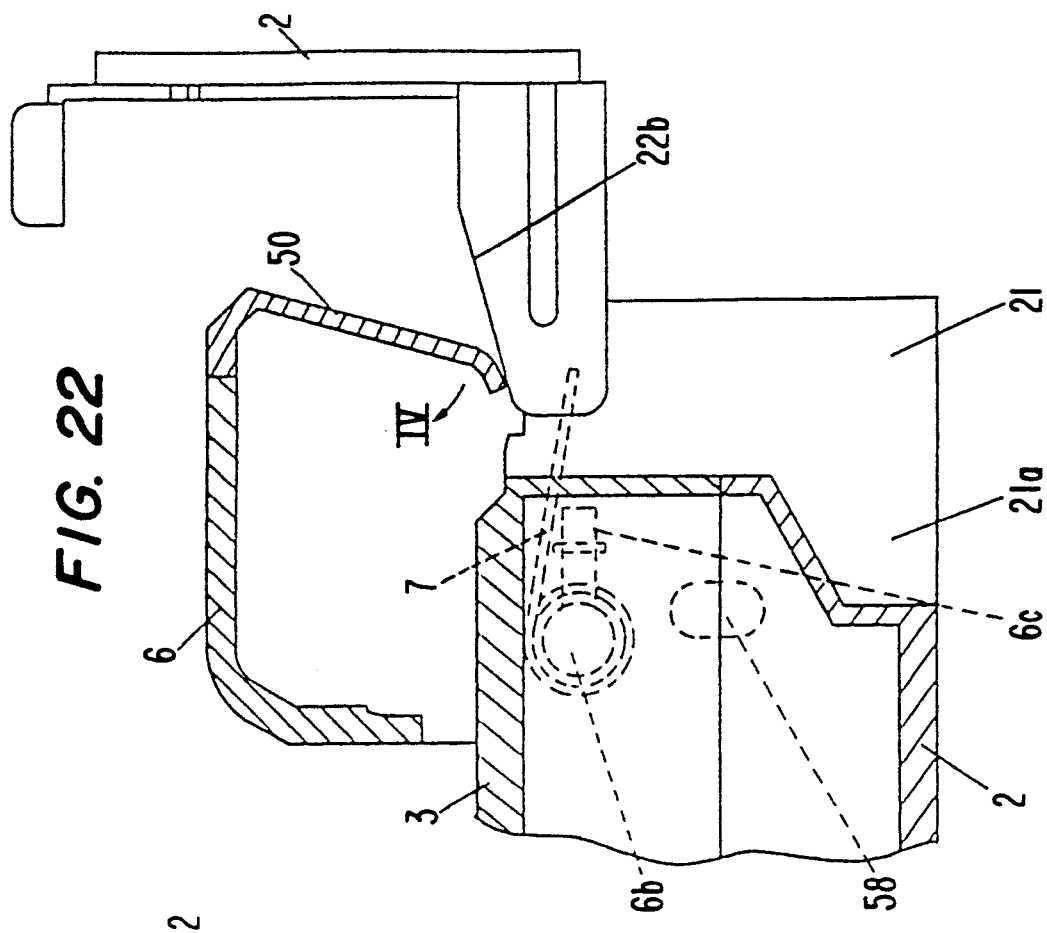

The lid opening mechanism of the first embodiment is constructed by the moving member 24. However, a simple protrusion 49 shown in FIGS. 20, 21, is used in the second embodiment.

Figure 22:
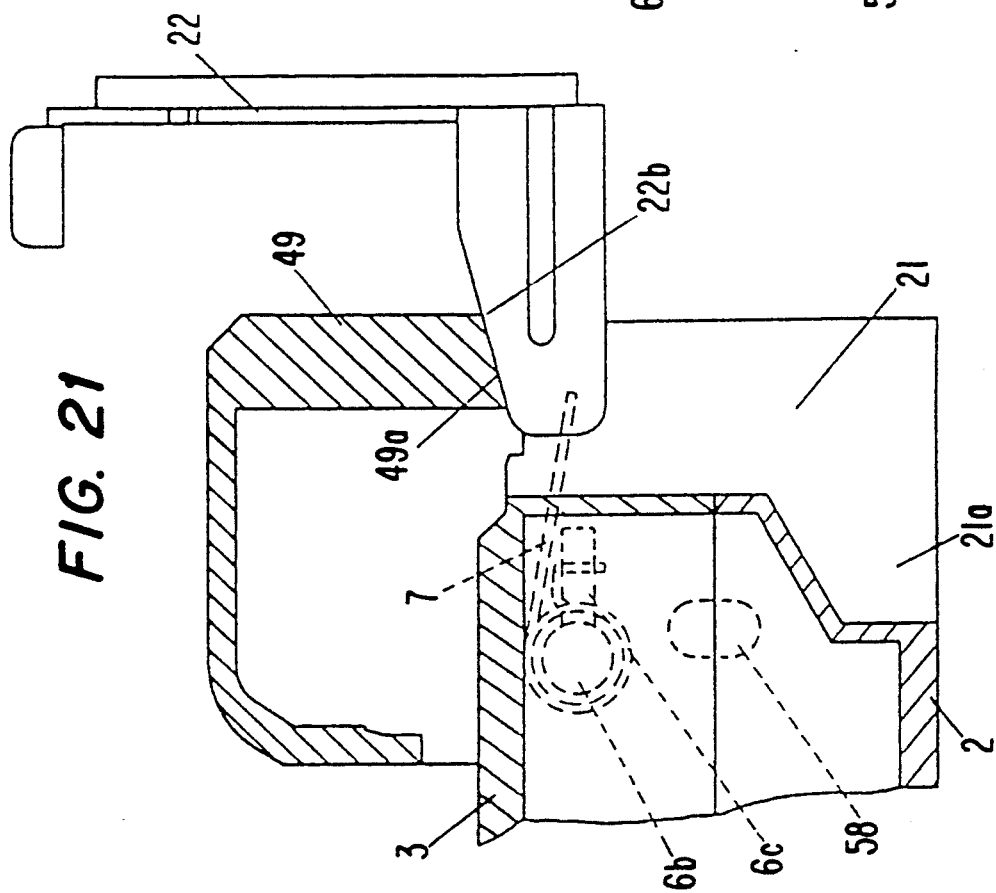
FIG. 22 is a sectional view of a main portion of a lids opening mechanism of a third embodiment.

In a third embodiment, as shown in FIG. 22, rather than the protrusion 49 provided at the inside of the front lid 6 in the second embodiment, the lid opening mechanism is formed by a front lid elastic protrusion 50, and the front lid 6 is restricted to rotate counterclockwise, as shown in FIG. 22, by means of a stopper (not shown) provided at the top cassette case 3.

Therefore, if a lid opening surface 22b of the lid opening member 22 attempts to improperly move the front lid 6 in the height direction, the front lid elastic protrusion 50 absorbs the error by means of elastic distortion in the direction of arrow IV, so that the rotation amount of the front lid 6 does not change.

Figure 23:
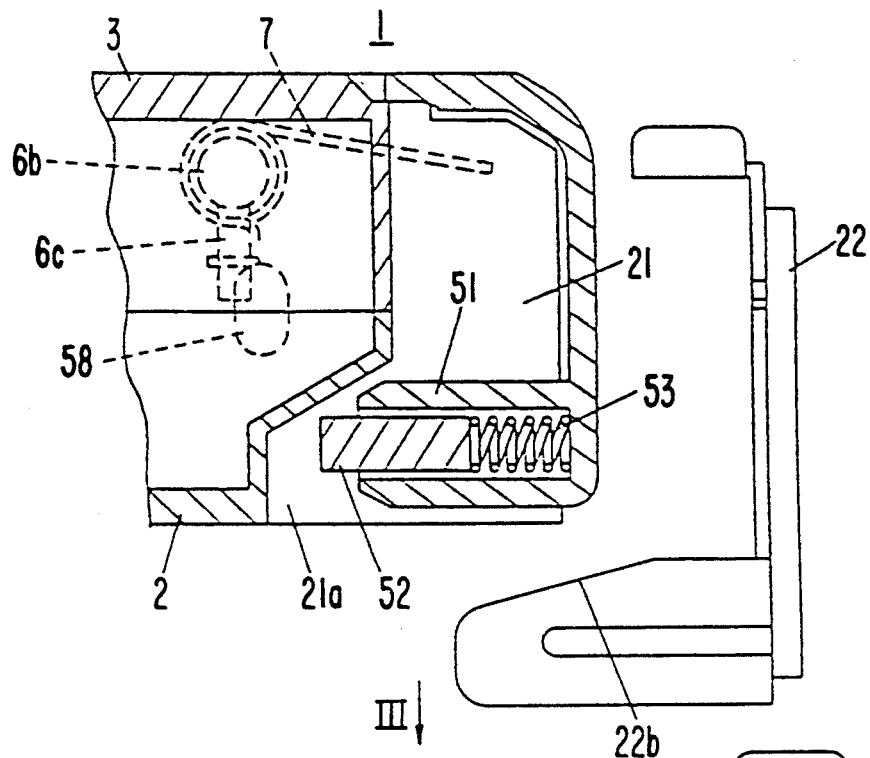
FIGS. 23 and 24 are sectional views of a main portion of a lids opening mechanism of a fourth embodiment.
Figure 24:
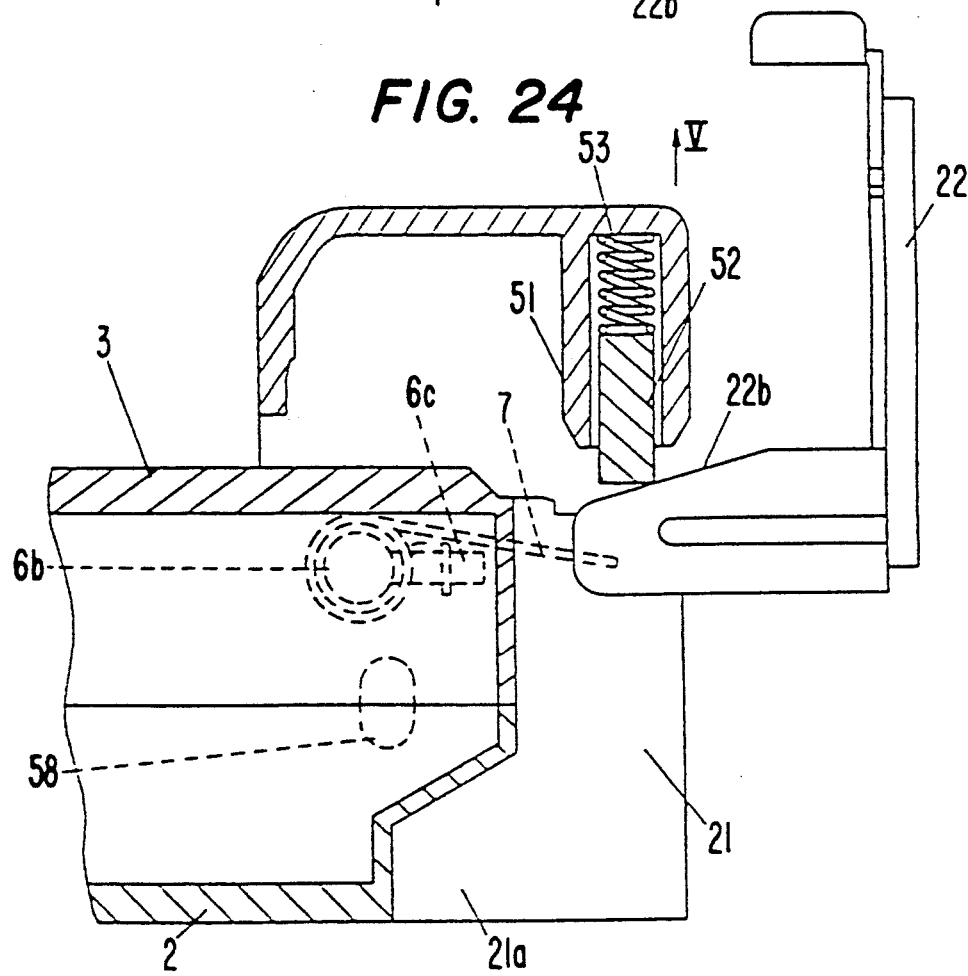

A fourth embodiment is shown in FIGS. 23 and 24. A first protrusion 51 is provided at the inside of the front lid 6. A second protrusion 52 is slidably supported on an inside of the first protrusion 51. The second protrusion 52 is always urged in a direction for engaging with the second cutout 21a by means of a compression coil spring 53.

There is provided a stopper (not shown) at the first protrusion 51 so that the second protrusion 52 will not be disengaged from the first protrusion 51.

In this embodiment, as well as the second embodiment, if a lid opening surface 22b of the lid opening member 22 attempts to improperly move the lid 6 in the height direction, the compression coil spring 53 absorbs the error of the second protrusion 52 by means of elastic distortion in the direction of arrow V, so that the rotation amount of the front lid 6 does not change.

Figure 25:
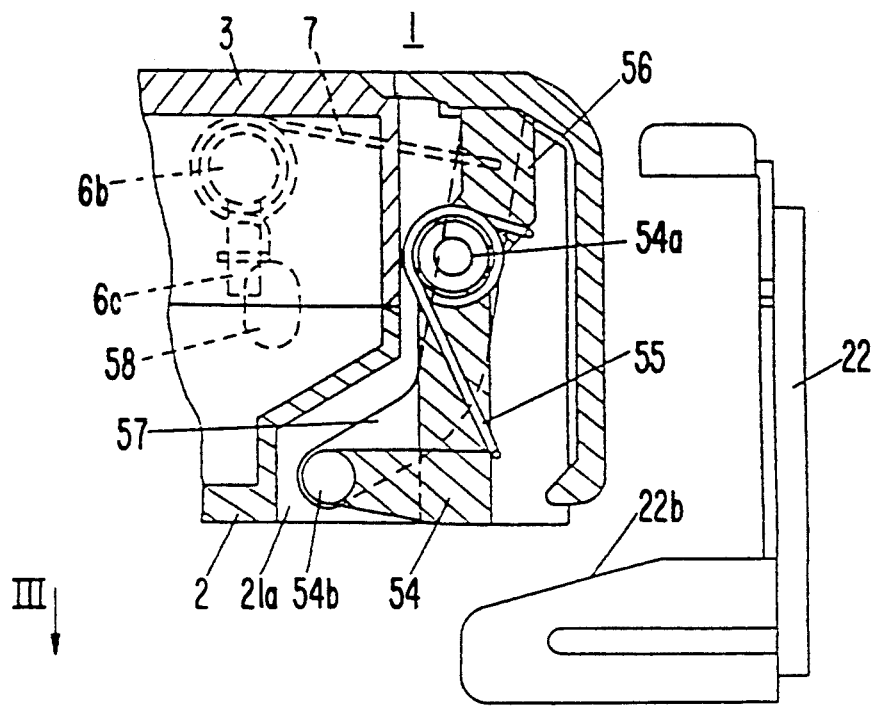
FIGS. 25 and 26 are sectional views of a main portion of a lids opening mechanism of a fifth embodiment.
Figure 26:
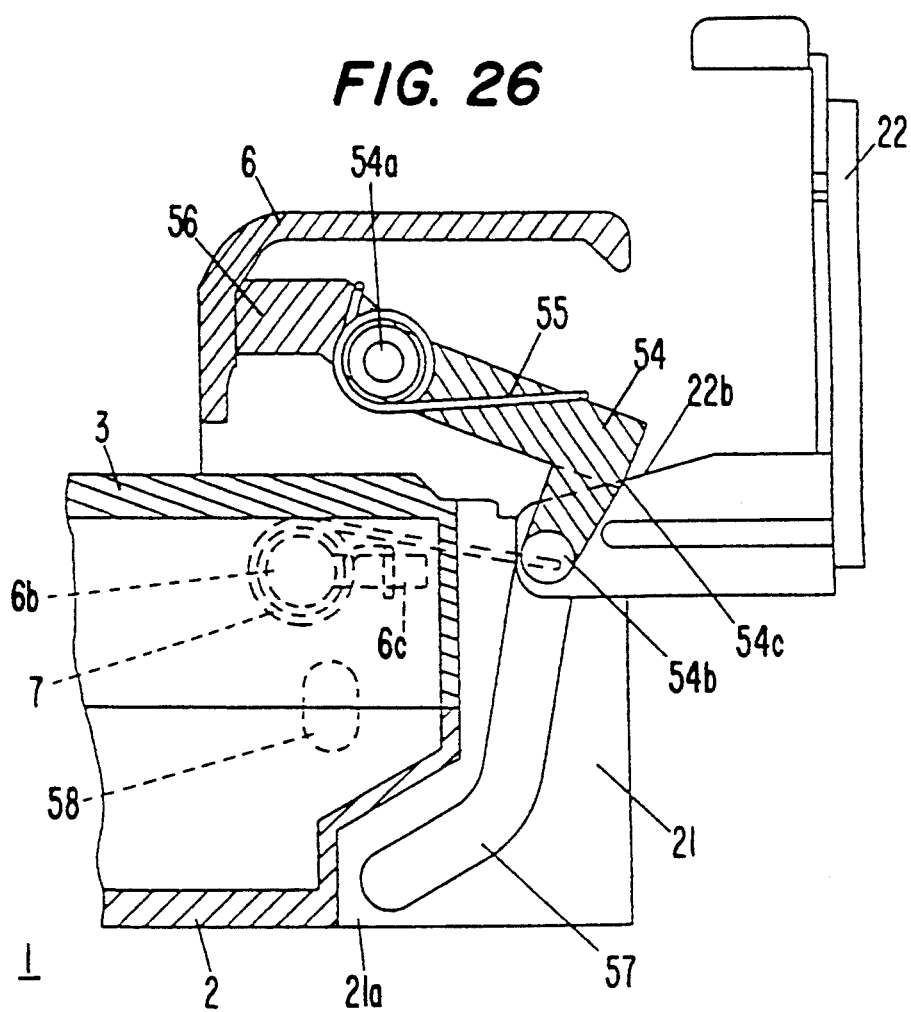

A fifth embodiment is shown in FIGS. 25 and 26.

As is the third and fourth embodiments in the fifth embodiment the front lid 6 is restricted to rotate counterclockwise, shown in FIG. 25, by means of a stopper (not shown) mounted on the top cassette case 3, and if a lid opening surface 22b of the lid opening member 22 attempts to improperly move the lid 6 in the height direction, a lid opening moving member 54 merely rotates about a rotation pin 54a against an urging member 55 and the rotation amount of the front lid 6 does not change.

Figure 27:
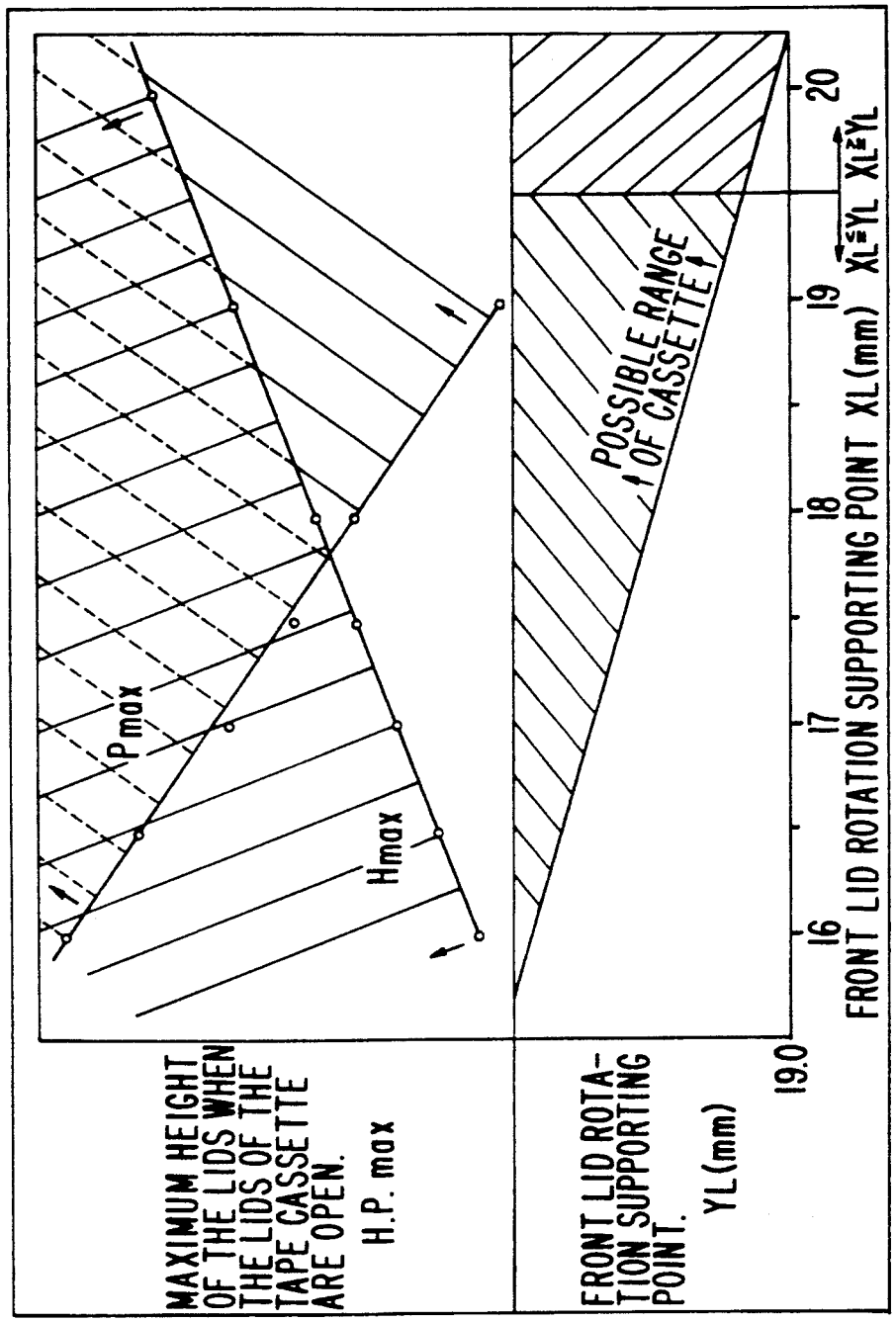
FIG. 27 is a diagram showing a relationship between the position of a rotation axis (XL, YL) and a maximum height of the tap cassette when the lids of the tape cassette are open.
Figure 28:
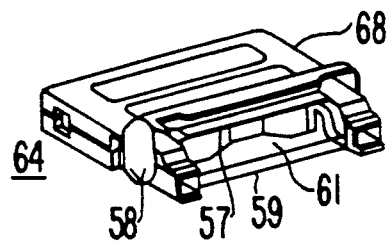
FIG. 28 is a perspective view of a tape cassette of the prior art.
Figure 29:
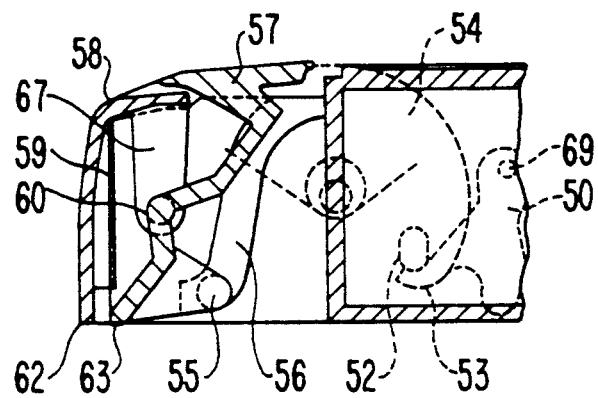
FIGS. 29 and 30 are sectional views of a main portion of the prior art tape cassette of FIG. 28.
Figure 30:
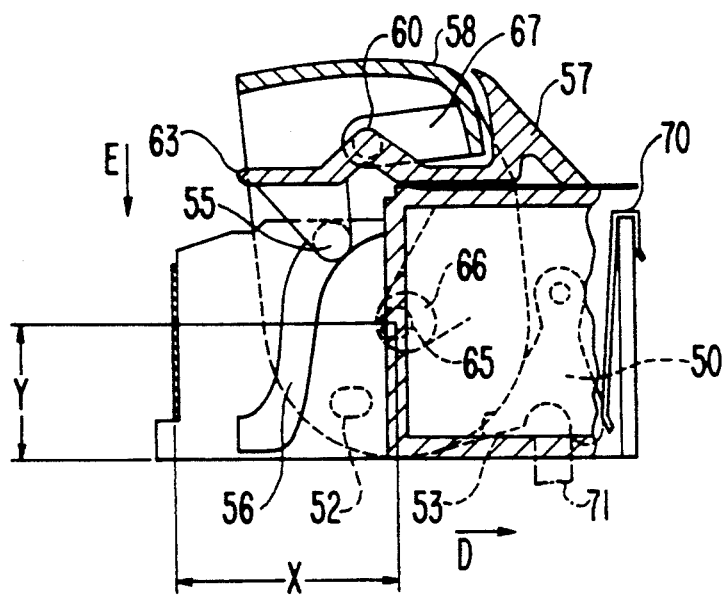

As described above with reference to FIG. 5, FIG. 27 shows a relationship between the rotation axis position (XL, YL) and a lid opening maximum height of the tape cassette 1 when the lids are open wherein a small space Sm is present at the openings 9a, 9b from the magnetic tape 5 surface to the front surface 13 of the assembled cassette case 2,3 and has a wherein the tape 5 is usually protected from dust by means of the front and inside lids 6, 8. The maximum lid opening height is classified into two, a maximum height Hmax of a front upper end 6K of the front lid 6 and a maximum height Pmax of a front lower end 6L of the front lid 6.

As is apparent from the diagram, though there are some possible positions (indicated at the right end of the diagram) where the relation XL≦YL is not satisfied. However, at these positions, the maximum height Hmax of the upper end 6k is large, so that a volume effectiveness of the tape cassette 1 is lowered (i.e. the space necessary to accommodate the tape cassette is increased).

If the space Sm is large, these conditions are unnecessary. However, a volume of the tape cassette 1 relative to an amount of a windable tape roll becomes large, and the volume effectiveness is reduced.

Specifically, it is necessary that the rotation axis position of the front lid 6 is such that XL≦YL in order to have low maximum lid opening heights (Hmax, Pmax) and to make sure that the magnetic tape 5 is properly protected from dust by means of the front and inside lids 6, 8.

What is claimed is:

1. A tape cassette comprising:
 a cassette case having an opening formed at a front portion thereof;
 a pair of tape reels mounted in said cassette case for winding a tape thereon and to which opposing ends of the tape are adapted to be attached, respectively;
 means for stretching the tape along a front surface of said cassette case at a predetermined location forwardly of said opening formed at said front portion of said cassette case;
 a front lid rotatably supported on side surfaces of said cassette case for rotation about a front lid rotation axis between a closed position in which said front lid is positioned forwardly of said predetermined location so as to cover a front surface of the tape stretched along said front surface of said cassette case, and an open position in which said front lid is not positioned forwardly of said predetermined location so as to expose the front surface of the tape stretched along said front surface of said cassette case;
 an inner lid rotatably supported on said front lid for rotation about an inner lid rotation axis between a closed position in which said inner lid is positioned rearwardly of said predetermined location so as to cover a rear surface of the tape stretched along said front surface of said cassette case, and an open position in which said inner lid is not positioned rearwardly of said predetermined location so as to expose the rear surface of the tape stretched along said front surface of said cassette case;
 a restriction plate extending from a bottom surface of said cassette case and located in said opening rearwardly of said predetermined location at which the tape stretched along said front surface of said cassette case is adapted to be disposed so as to prevent rearward movement of a portion of the tape stretched along said front surface of said cassette case; and
 means, comprising a U-shaped cutout portion of said inner lid provided at a position facing said restriction plate when said inner lid is in its closed position, for engaging with said restriction plate in such a manner as to leave a space between said inner lid and said restriction plate when said inner lid is in its closed position.

2. A tape cassette as recited in claim 1, wherein said front and inner lids, when in their closed positions, cover said restriction plate.

3. A tape cassette as recited in claim 1, wherein a position determining hole is provided in said cassette case for positioning said cassette case in a recording and reproducing apparatus into which said cassette is adapted to be inserted, said position determining hole being located adjacent said restriction plate.

4. A tape cassette as recited in claim 1, wherein said front lid rotation axis is located a distance from a bottom surface of said cassette case which is equal to or greater than a distance between said front lid rotation axis and said predetermined location at which the tape stretched along said front surface of said cassette case is adapted to be disposed.

5. A tape cassette as recited in claim 1, wherein said front lid is rotatably supported on said cassette case for rotation in a predetermined rotational direction about said front lid rotation axis from said closed position of said front lid to said opening position of said front lid; and
 said inner lid is rotatably supported on said front lid for rotation in said predetermined rotational direction about said inner lid rotation axis from said closed position of said inner lid to said open position of said inner lid.

* * * * *